United States Patent

Powell, Jr.

[11] Patent Number: 6,069,002
[45] Date of Patent: May 30, 2000

[54] SYSTEM AND PROCESS FOR IN TANK TREATMENT OF CRUDE OIL SLUDGES TO RECOVER HYDROCARBONS AND AID IN MATERIALS SEPARATION

[75] Inventor: John E. Powell, Jr., Las Vegas, Nev.

[73] Assignee: APLC, Inc., Wilmington, Del.

[21] Appl. No.: 08/885,108

[22] Filed: Jun. 30, 1997

Related U.S. Application Data

[63] Continuation-in-part of application No. 08/228,877, Apr. 11, 1994, abandoned.

[51] Int. Cl.⁷ .............................. D06M 16/00; B08B 7/00
[52] U.S. Cl. ...................... 435/264; 435/281; 134/22.18; 134/22.19; 134/40
[58] Field of Search .................... 435/264, 281; 134/22.18, 22.19, 40

[56] References Cited

U.S. PATENT DOCUMENTS

| | | | |
|---|---|---|---|
| 3,769,164 | 10/1973 | Azarowicz | 435/281 |
| 4,153,553 | 5/1979 | Davis | 210/95 |
| 4,276,094 | 6/1981 | Gutnick et al. | 134/10 |
| 4,364,776 | 12/1982 | McBride et al. | 134/10 |
| 4,474,622 | 10/1984 | Forster | 134/10 |
| 4,897,205 | 1/1990 | Landry | 210/766 |
| 5,085,710 | 2/1992 | Goss | 134/22.14 |
| 5,271,851 | 12/1993 | Nelson et al. | 210/770 |
| 5,580,391 | 12/1996 | Franco et al. | 134/5 |
| 5,611,869 | 3/1997 | Hart | 134/22.19 |
| 5,653,865 | 8/1997 | Miyasaki | 208/13 |

*Primary Examiner*—David A. Redding
*Attorney, Agent, or Firm*—Mark A. Oathout

[57] ABSTRACT

A method for removing a sludge from a crude oil tank while recovering hydrocarbons from the sludge. The method is carried in the crude oil tank. The sludge is studied to determine a preferred treatment fluid. Once the treatment fluid is in place in the tank, the contents are vigorously mixed and agitated. Subsequently, the contents of the tank are sampled and any recovered hydrocarbons are removed, followed by removal of the treatment fluid.

5 Claims, 10 Drawing Sheets

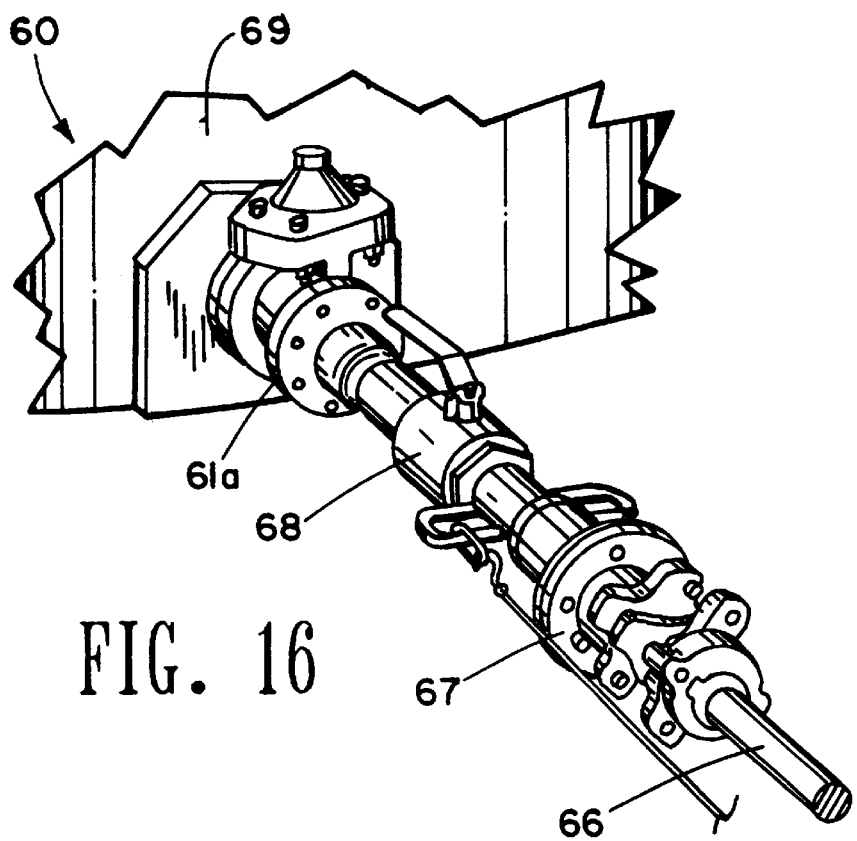
FIG. 16
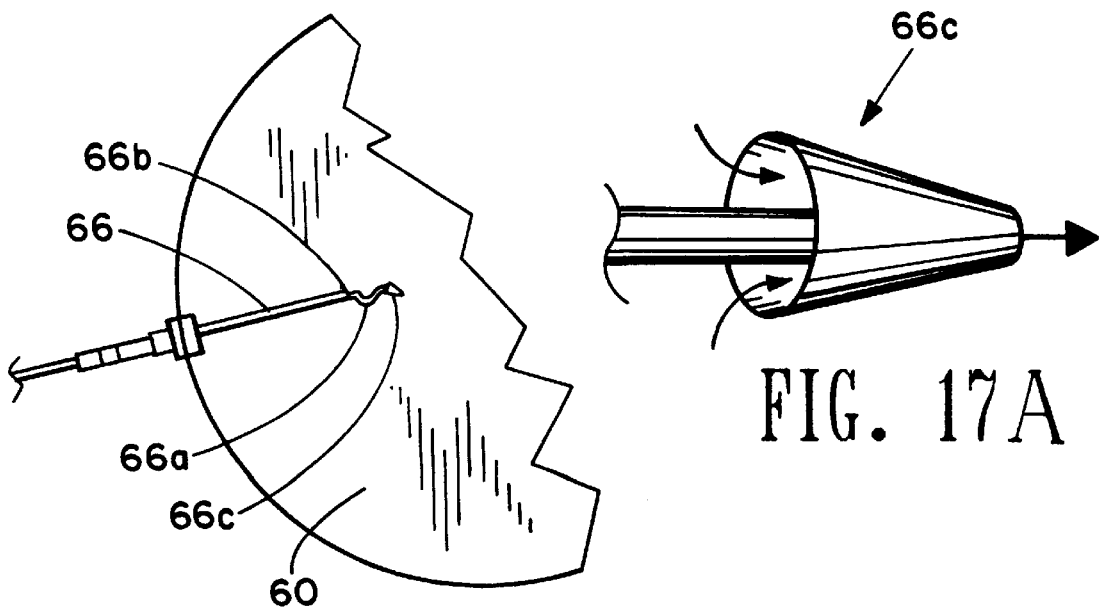
FIG. 17
FIG. 17A

6,069,002

SYSTEM AND PROCESS FOR IN TANK TREATMENT OF CRUDE OIL SLUDGES TO RECOVER HYDROCARBONS AND AID IN MATERIALS SEPARATION

This application is a continuation-in-part of prior U.S. application Ser. No. 08/228,877 filed Apr. 11, 1994, now abandoned.

BACKGROUND OF THE INVENTION

This invention relates to an age old problem that goes back to when oil was first stored in tanks or vessels. The term "crude oil" refers to oil recovered from below the earth's surface which remains "untreated" or unrefined. The problem begins when contaminants settle out in the bottom of oil storage tanks. Contaminants come from various sources and some of the contaminants are indigenous to the crude oil itself. Sludge forms when naturally occuring solids (formation sands) as well as rust and scale from piping and tank walls, and higher molecular weight hydrocarbons separate from lighter hydrocarbons and sink to storage tank bottoms. Overtime, this matter referred to as sludge, sludge oil or tank bottoms forms on the bottom of the tank or storage vessel. Operators (personnel involved with oil facilities) must deal with this sludge problem, as it hampers normal procedures and increases oil handling and treatment costs. Tanks are also required to be routinely inspected for structural integrity, involving such concerns as possible leaks, damage and corrosion.

Past methods for cleaning contaminants involved mechanical removal of the contaminants by vacuum trucks and hydroblasting equipment, e.g. bob cat, dragline and robotics to name a few. These methods require entry into the tank by authorized personnel. Little was done to reduce the volume of the contaminants prior to removal.

Then came the use of chemical methods, using hot water and diluent. A Nalco Chemical process (See U.S. Pat. No. 5,085,710 Date February 1992), relies on chemicals to reduce the oil mass in sludge oil bottoms. These chemicals are not environmentally engineered, and are considered harmful to living organisms.

SUMMARY OF THE INVENTION

The present invention has several advantages over the above methods. Common "sludge oil" or "tank bottoms" are often comprised of over 50% recoverable oil. This invention enhances recovery of this oil in an environmentally effective way. This method will consistently convert sludge waste to marketable crude oil or a useful hydrocarbon.

This invention includes procedures to naturally disband the components that form sludge oil or tank bottoms in crude oil storage tanks or vessels, using either naturally occurring microbial cultures (referred to herein as bacteria, microbes or microorganisms) and stimulating them, introducing new strains which adapt to a difficult environment and/or the use of mechanical and/or thermal energy. These procedures may be introduced into the problem sludge either through an oil or water based medium.

The use of micro-organisms and biosurfactants is a non-emulsifying cleaning procedure. The naturally occuring micro-organisms are environmentally safe and the EPA does not regulate their release into the environment.

Biosurfactants are not petroleum derivatives and are non-toxic, ecologically safe and completely biodegradable.

Several service companies offer varying commercial strains of bacteria and biosurfactants. This invention provides a specific way of using them for the recovery of hydrocarbons. Bacteria are available that adapt and metabolize (dislodging of compounds) at temperatures above 90 F. This bacteria may be used when the invention utilizes thermal energy.

Tanks and vessels can now be economically cleaned using a natural, environmentally safe process without forming emulsions with the sludge oil bottoms (as do some other methods). An emulsion is not desirable, it hampers the effort to optimize hydrocarbon recovery value from sludge oil.

In conclusion, this invention recovers a large percentage of hydrocarbons from sludge oil and with biolgic action raises the recovered hydrocarbon's specific gravity, increasing its market value. By freeing hydrocarbons from the sludge, the water which is tied up in the sludge is also released. The released water can be processed through normal wastewater treatment systems. This invention measurably frees the hydrocarbon content of the solid portion of a sludge and in some cases renders sludge completely hydrocarbon free. Such solids can be landfilled, land farmed, or if they contain a hydrocarbon value of 5,000 BTU/lb or greater, they can be used as a source of BTUs for fuels blending. Coal fines can also be used in the invention as a dehydrating agent and BTU intensifier. This invention is environmentally sound, converts sludges which were previously considered waste and returns an economic value to the hydrocarbons separated from the sludge, placing it in the market where it belongs.

The invention requires less manpower than other methods and involves cost savings with true value to the operator and our environment.

This invention relates to a process that generally deals with the use of bacteria and/or chemicals and surfactants with thermal and mechanical energy to cause separation of hydrocarbons. The separation/recovery of hydrocarbons, thermally, chemically, mechanically and/or with bacteria increases the recovery of hydrocarbons from "sludge".

Bacteria are generally 1 to 4 micrometers in length and 0.1 to 0.3 micrometers in width. They are marine microorganisms which can be adapted to function in a crude storage tank or vessel environment. Strains can move and migrate by their own propulsion system toward a food source. Research on bacteria strains is ongoing, and with recent developments in temperature limitations, organisms are now capable of metabolizing at temperatures in excess of 90 F. (e.g. from 90 degrees F. to 230 degrees F. (according to publications from Canada microorganisms are being used in oil wells at such temperatures)). When adding thermal energy, the present invention normally functions in the temperature range of 135° F. to 185° F. However, many microorganisms live best at temperatures below 110° F. Therefore, the consideration when adding thermal energy to treat sludge involves creating optimal temperatures for separation and microorganism concerns.

Bacteria may be naturally occurring in the sludge or may be introduced into the "sludge oil" environment. They may be introduced either in an aqueous or hydrocarbon medium which has bio-enhancement with nutritional benefits to inoculate and disperse in the system. This will greatly increase optimum penetration and non-emulsifying removal of hydrocarbons contaminated with other material in a "sludge oil" state. The bacteria can migrate through free water and into the sludge. The media introduced to the tank is circulated and can be heated. This warming stimulates biological activity and as the microbes grow digesting the sludge the lighter recoverable hydrocarbons separate from the heavier a "sludge oil" thereby creating recoverable hydrocarbons. The procedure is successful in separating the hydrocarbons from the "sludge oil".

The resulting "clean" hydrocarbons are recovered on the surface to be refined while the volume or level below the hydrocarbons is returned through a draw system, commonly to an API separator or wastewater recovery system. Water recovered from the system may also be deep well injected. Solids may be recovered when they are in a sufficient quantity to warrant removal. In some low volume cases operators have chosen to leave the solids in place. Such solids are biologically enhanced by the bacteria, and depending on other variables, they may be landfilled with bacterial work ongoing. At the very least, these solids will continue to decompose, and return to a natural soil condition in time. The solids may be used for fuel blending if the solids have a BTU value per pound of 5,000 or greater. If the solids have less than 5,000 BTU/lb they can be blended with coal or other dry BTU enhancing material (as a BTU intensifier and drying agent) to aid in residual sludge recycling.

This hydrocarbon recovery system greatly reduces the volume of waste sludges as compared to previous treatment and/or removal methods. The goal is to maximize hydrocarbon recovery and to minimize residual solids. Certain embodiments of this invention are not limited to any particular individual features disclosed, but include combinations of features distinguished from the prior art in their structures and functions. Features of the invention have been described so that the detailed descriptions that follow may be better understood, and in order that the contributions of this invention to the arts may be better appreciated. These may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. This invention is to be read to include any legally equivalent devices or methods which do not depart from the spirit and scope of the present invention.

The present invention recognizes, addresses and meets the previously-mentioned preferences or objectives in its various possible embodiments and equivalents thereof. To one of skill in this art who has the benefit of this invention's realizations, teachings, disclosures, and suggestions, other purposes and advantages will be appreciated from the following description and the accompanying drawings. The detail in the description is not intended to thwart this patent's object to claim this invention no matter how others may later disguise it by variations in form or additions of further improvements. These descriptions illustrate certain preferred embodiments and are not to be used to improperly limit the scope of the invention which may have other equally effective or legally equivalent embodiments.

BRIEF DESCRIPTION OF THE DRAWINGS

FIG. 16 is a perspective view of a lance connected through an opening to a tank.

FIG. 17 is a top view of a lance connected through an opening to a tank.

FIG. 17a is a perspective view of an inductor nozzle.

DETAILED DESCRIPTION OF THE INVENTION

Figure 1:
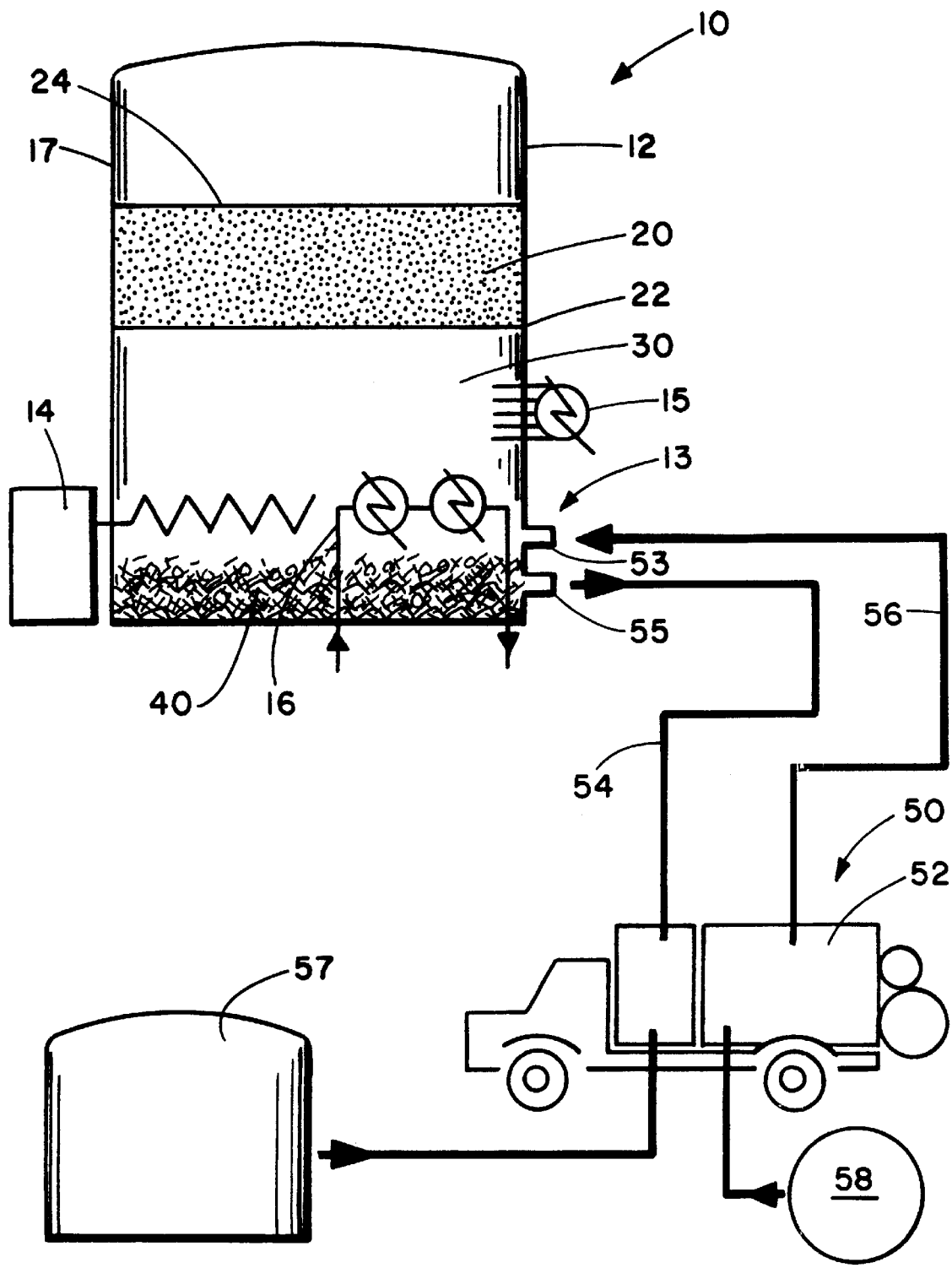
FIG. 1 is an elevational schematic view of a tank with sludge at the bottom of the tank and hydrocarbons recovered by the invention at the top of the tank with outside sources for treatment.
Figure 2:
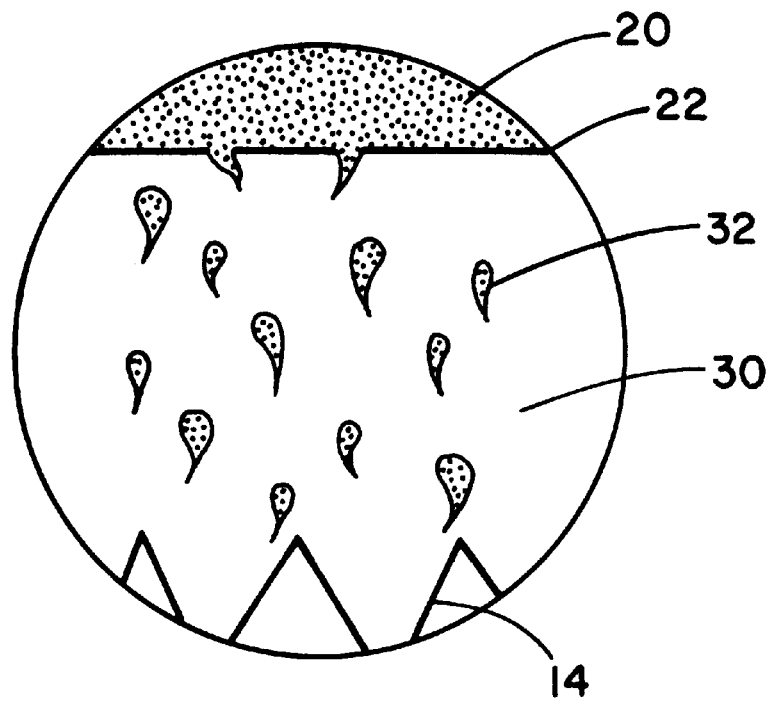
FIG. 2 is a detail view taken from FIG. 1 of microorganism action in recovering hydrocarbons from the sludge oil tank bottoms as the hydrocarbons migrate to the top of the treatment medium.
Figure 3:
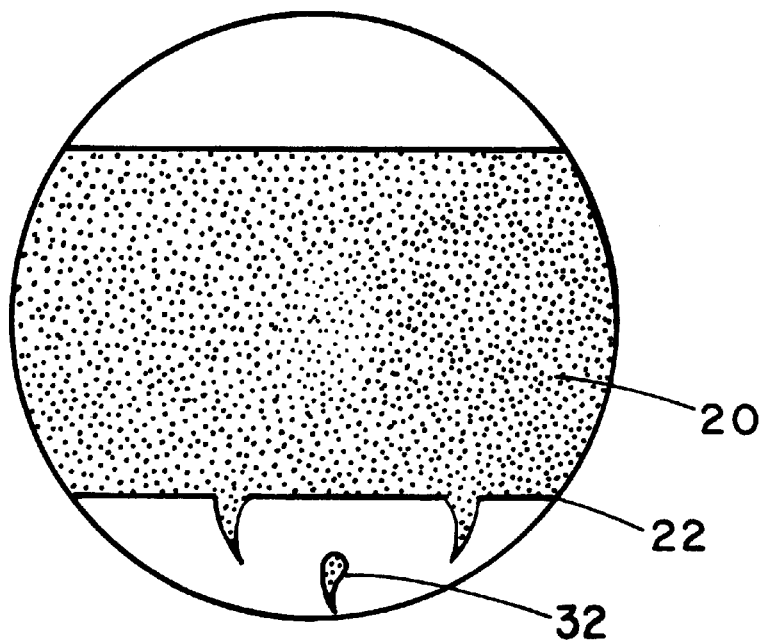
FIG. 3 is a detail view of the floating hydrocarbon volume or level as it appears on top of the treatment medium, where the microbes continue to break down the hydrocarbons into a higher API gravity of oil.

Referring to FIGS. 1–3, the hydrocarbon recovery process and system 10 includes the following procedures as implemented by one of ordinary skill in the art. One of ordinary skill in the art is generally a tank cleaning operator who has several years of experience in cleaning crude oil tanks 12. Coupled in this experience is the knowledge that every job and sludge is unique and lends itself to tweaking and combining various approaches to cleaning same.

First, preliminary samples are taken of "tank bottoms" or "sludge oil" 40 in the tank or storage vessel 12. Lab work and/or treatability studies are implemented to define the general make-up of the sludge 40. For example, the lab work determines the percentage of hydrocarbon, water, and solids present in the sample. An operator uses a treatability study to suggest or indicate the most effective procedure.

The next step is to determine the composition of the sludge, ie; salt, asphaltines, paraffins, rust and sand type solids. This will help an operator understand the volume and type of solids which will remain in the tank or vessel 12 at the completion of the process.

Treatment dosages may be determined by altering microbes 32, chemical and surfactant concentrations, then monitoring the effects. The sludge samples are treated with various commercially available microorganism strains or they are treated with nutrients designed to enhance the development of natural microorganisms 32. To obtain the microorganisms 32 and/or biosurfactants and information on the use of same one would simply contact a supplier of same, such as Biosystems Corp. of Roscoe, Ill.; Gelman Sciences of Ann Arbor, Mich.; Bio-Technologies of Landisville, N.J.; Ecological Labs of Freeport, N.Y.: or Sybron Biochemical of Birmingham, N.J., notify them about the nature of the sludge and procedures to be used and request four to five different samples to test. The samples may contain microorganisms and/or bio-surfactants, either naturally occurring surface active compounds produced by micro-organisms 32 or of the synthesized type. The viscosity or grade of each sample is compared to the viscosity of an untreated sample over time. The sample showing the greatest percentage of viscosity change over time indicates the preferred treatment. However, one must also consider the cost of treating with a particular microorganism 32. The knowledge obtained from the lab work should now be applied in similar proportions in the field. Measurements referred to as parts per million or "PPM" refer to the sum total of sludge and fluid or chemical treatments. A detailed example follows which encompasses a broad range of various crude sludges.

Reduce the existing liquid level of the crude storage tank or vessel 12 to a minimum. Note the remaining sludge 40 volume in the tank 12 in U.S. barrels (forty-two U.S. gallons each). With prior lab work completed, the total volume of the treatment fluid 30 which will be needed can be determined. This usually runs in the range, in volume, of one to five parts aqueous treatment fluid 30 to one part sludge 40.

Determine the composition of the preferred fluid treatment solution 30. The decision is largely dependant upon the composition of the sludge 40, the results of the treatability study and the knowledge and experience of the operator. If chosen, an aqueous treatment, water-based solution 30 (hereinafter referred to as "aqua-treat fluid") may comprise fresh or salt water. The "aqua-treat fluid" 30 should be introduced into the tank or vessel from the truck 50 at 90–150 degrees F. via a source 58.

This step may need to be adapted according to the various conditions which exist in the field. A tank or vessel 12 may have its own internal heat exchanger (heat cable 15 shown on outer diameter), or steam coil system 16. In this case "aqua-treat fluid" 30 may be introduced at an ambient temperature and the temperature is then increased as the "aqua-treat fluid" 30 is circulated. The optimal temperature range may be determined by the preference of the particular bacteria 32 chosen.

The "treatment fluid" 30 should contain approximately twenty parts per million nitrogen, a phosphorus level of at least five parts per million, and a neutral pH (adjusted if/as necessary) for the purpose of creating an environment which will stimulate the growth and reproduction of bacteria 32. These levels are to be used as a guideline, regardless of whether inoculating the system with microbes/bio-cultures and/or attempting to stimulate microbes naturally occurring in the system. The materials and ingredients nitrogen, phosphorus and environmentally friendly pH adjusters are commercially available. The "aqua-treat fluid" 30 can be adjusted to meet these guidelines either while circulating or in treatment of "aqua-treat fluid" prior to introduction into tank 12.

The system may also be aerated. Aeration is beneficial to bacteria which thrive in an oxygenated environment. Anaerobic bacteria, however, thrive where there is no free oxygen. A nitrogen perging system could be implemented in such a situation.

As the microorganisms break down the sludge (by cleaving large chain hydrocarbons into smaller ones or as a physical change accomplished through the production of a biosurfactant from the microorganisms), oil migrates upward where it is further broken down by microorganisms, thereby increasing the specific gravity of the hydrocarbons.

The volume of aqua-treat fluid 30 is extracted from below level 22 (below the volume of floating hydrocarbon 20), moved through line 54, truck 50 via pump 52 and returned via line 56 into the same volume 30, or in cases where access through the bottom side 13 of the tank 12 is limited or when it may be desirable to cascade down the sides 17 to aerate the contents, returned above the level 22. In cases where sludge 40 has low levels of hydrocarbon contamination (generally, but not limited to, sludge having less than ten to fifteen percent hydrocarbons by volume), or hydrocarbons are negligible at the surface 24 of the tank 12, the circulated return fluids may be aerated at the circulating pump 52 or at the point of return 53, entering the tank 12 at optional points around the perimeter, encompassing the volume of floating hydrocarbons 20. Some tanks 12 have existing tank mixers 14. If tank mixers 14 are in place, these should be turned on at and for a determined time. This will enhance the circulation or dispersion of heat, bacteria 32, and nutrients.

Biodegradable cleaning surfactants may also be used in conjunction with the above procedures as a part of the fluid treatment. Some examples of surfactants which may be used are BG-Clean-401, BG-Clean-406, BG-Clean-412, Bio-enhancer 850, and BG-Clean-715 Sludge Softener. All of these are commercially available from a manufacturer called Biogenesis located in Bismarck N. Dak. Each has instructions on recommended dosages which should be followed. Many commercially available biogradable surfactants and solvents contain their own proprietary mixture of bio-enhancement additives. Preferably, they should contain no petroleum derivatives, be non-toxic, ecologically safe and completely biodegradable. Naturally occurring bio-surfactants which result from micro-organism 32 activity/ growth are beneficial to the desired result of optimizing hydrocarbon recovery and enhancing the specific gravity during the process of breaking down sludge oil 40. A microorganism supplier can be contacted in this regard. The addition of commercial surfactants also enhances the benefits of naturally occurring surfactants by making the surfactants effective in a shorter time span.

After nitrogen, phosphorus and pH levels are acceptable, one may proceed to inoculate the "aqua-treat fluid" with bacteria 32. The addition of microbial cultures, bio-surfactants and solvents, in combination or singly, is optional as a variable.

It should be obvious from the previous discussion that the composition of "aqua-treat fluids" 30 will vary from case to case. Several genera of bacteria 32 may be tested or used in the invention. Some common types, which may be used are PSEUDOMONAS, FLAVOBACTERIUM, ACINETOBACTER, AZOTOBACTER, KLEBSIELLA, ALCALIGENES, and RHIZOBIUM although other types are available and may be tested. The bacteria 32 possess complex metabolic schemes for utilization in bioremediation. Identification of all of the types of bacteria/microbes has been compared to the attempt of classifying all the insects in the world. This has not been done, and as the identification process is ongoing, new and useful adaptations of bacteria may be discovered and implemented into the present invention.

Working example figures relating to the invention will follow. Volumes discussed relate to "total possible volume of the system", meaning the sum combination of "total sludge 40 volume" (after removal of all preexisting fluids from the tank 12), and the total volume of aqua treatment fluids 30 introduced to the system.

EXAMPLE

Treatment Fluid Schedule

The information outlined below relates to general rates for crude oil storage tanks 12 as oil is removed from oil wells, (defined as non-refined "crude oil").

| VOLUME OF TOT. SYSTEM IN BARRELS (42 U.S. GALLONS EACH) | INOCULATION CULTURE DOSAGE | BIODEGRADABLE CLEANERS/ BIOSURFACTANTS |
|---|---|---|
| 250–1,200 BBLS | 1 LB/120 BBLS | 1 GAL/30 BBLS |
| 1,200–7,200 BBLS | 1 LB/240 BBLS | 1 GAL/60 BBLS |
| 7,200–24,000 BBLS | 1 LB/480 BBLS | 1 GAL/100 BBLS |
| 24,000 + BBLS | 1 LB/600 BBLS | 1 GAL/130 BBLS |

Treatment fluid 30 dosages will vary according to the specific conditions of a tank 12 and with various goals in mind.

As an option, for tank bottoms or sludge oil 40 which is largely composed of asphaltines and/or heavy paraffin oils, it may be desirable to substitute about ten to fifty percent by volume clean oil for water as an "aqua-treat fluid" 30. Procedurally such a fluid 30 will be applied or used in the same manner as the other "aqua-treat fluids" 30. An oil used as a treatment fluid 30 may also contain any combination of bacteria 32 and/or nutrients (hereinafter referred to as "oil-treat fluid"). The oil used can be #2 fuel oil, or any other similar high gravity hydrocarbon preferably having a low flash point, (which must always be considered when heating flammables) supplied by a storage vessel 57. In most cases, the "oil-treat fluid" is used in conjunction with the "aqua-treat fluid" 30, with the "oil-treat fluid" the lessor in overall volume. The "oil-treat fluid" volume may be derived or separated from the beginning "sludge" 40, ranging from 20% (twenty percent) to 100% (one hundred percent) of the volume of the sludge 40. The "oil-treat fluid" may also be introduced as the first ingredient or during the "aqua-treat fluid" phase. Regardless, it is mentioned as an optional treatment procedure.

Figure 15:
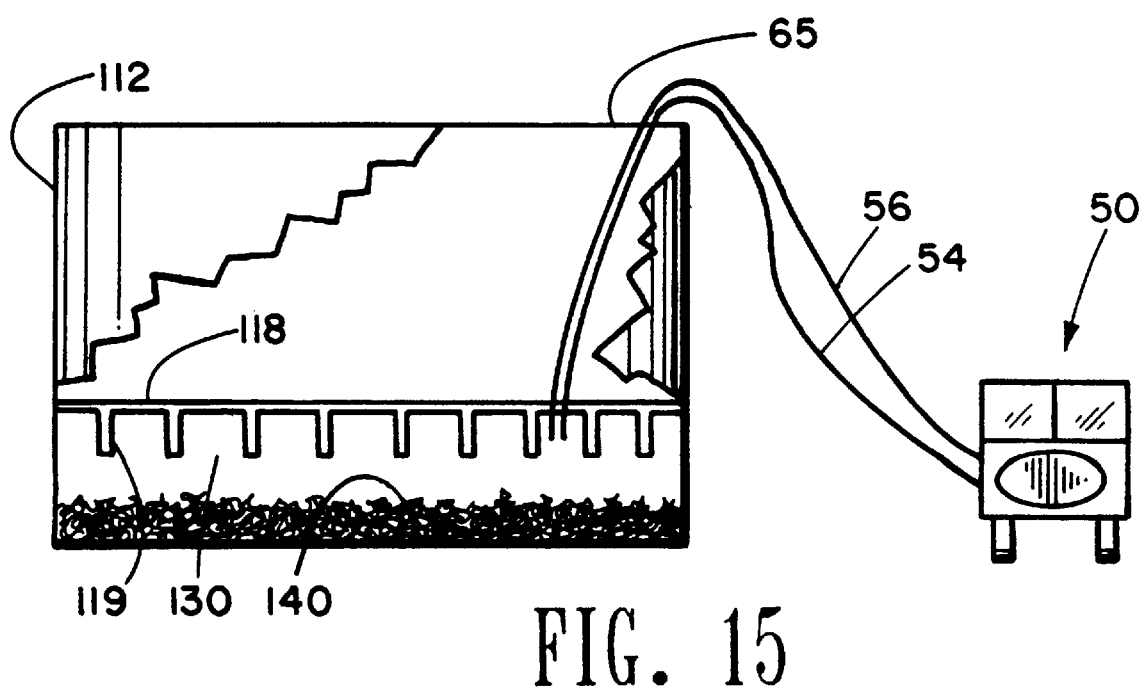
FIG. 15 is a schematic view of a tank having a floating roof with the present invention pumping fluids over the top of the tank.

In cases of treatment of large tanks 112 with floating roofs 118 (FIG. 15), the "aqua-treat fluid" volume 130 may need to be of a sufficient nature to facilitate floating the roof 118 off its supporting legs 119, insuring that any air pocket is unlikely to exist. For example once the preexisting fluid is removed from such a tank 112 a space may be created between the sludge 140 and the bottom of the roof 118. This space should be filled or replaced by the treatment fluid 130. Aeration would not likely be used in the case of a floating roof 118.

A working example follows: a tank contains 50,000 (fifty thousand) barrels of crude oil. All "free" flowing oil is removed from the tank, leaving behind the "sludge oil", or "tank bottom", which is 10,000 (ten thousand) barrels. This 10,000 (ten thousand) barrels is what is termed "total sludge volume". After 12,000 (twelve thousand) barrels of "aqua-treat fluid", and 5,000 (five thousand) barrels of "oil-treat fluid" are added, the "total volume of the system" is 27,000 (twenty seven thousand) barrels. For the inoculation dosage, (after nitrogen, phosphorus, and pH levels are optimal) one would refer to a supplier/manufacturers chart addressing the volume of the system, and read the culture dosage in pounds per barrel. In this example, the volume of the system being 27,000 (twenty seven thousand) barrels, the suggested inoculation dosage would be one (1) pound per 600 (six hundred) barrels, which equates to 45 (forty five) pounds of actual microbial cultures introduced into the treatment fluids.

Next the tank 12 contents are heated and maintained in excess of ninety degrees Fahrenheit, by a steam coil 16, heat exchanger 15, hot oil truck/s 50, or other means or combinations thereof available to the operator. One purpose for the addition of heat is to stimulate the bacteria 32 and its growth.

The sludge 40 should be monitored to update hydrocarbon levels in the sludge 40 by catching and analyzing a sample of the sludge 40. When the hydrocarbon level is determined to be low or non-existent (normally after about 7–21 days) tank mixers 14, heat sources 16, 50 and circulating pumps 52 can be shut off. However, the process is still incomplete. The operator then checks the volume of the top oil 20. Regardless of the treatment fluid 30 used, the volume of top or floating oil 20 should be of a viscous nature by which an operator can manage its treatment. If it is not, and floor solids (the remnants of the treated sludge 40) are to a satisfactorily low level of hydrocarbon contamination, then oil or an "oil-treat fluid" may be added as needed to create a volume of floating hydrocarbon 20 which is of value. If time is not an immediate concern, an operator may decide to let the "system" work by giving the microbes additional time to breakdown or treat the sludge 40. However an operator must normally consider time requirements. In some cases, where the aqueous volume is not a sufficient barrier between the tank bottoms 40 and the hydrocarbon level 22, then fresh or salt water can be introduced to raise the hydrocarbon level 22 and separate it from the tank bottoms 40. This will insure a proper buffer and also aid in the removal of hydrocarbon from the solids remaining in the bottom of the tank 12 (it helps displace hydrocarbons from any solids, sand remaining in the bottom of the tank). It is preferable for this water to be hot and added in a volume which is in the range of twenty to fifty percent in excess of the volume of hydrocarbons remaining in the tank bottoms 40. This phase is complete when hydrocarbon "free" or near "free" solids exist (generally, but not limited to solids at the bottom of the tank 12 having less than 5% hydrocarbons by volume).

Next remove the volume of oil 20 from top of tank 12 as a useable hydrocarbon ready for refinement.

The aqueous level is removed at the bottom of the tank 12 through a typical water draw system 55. When all liquids are removed, the tank hatch doors/manways may be removed.

Figure 12:
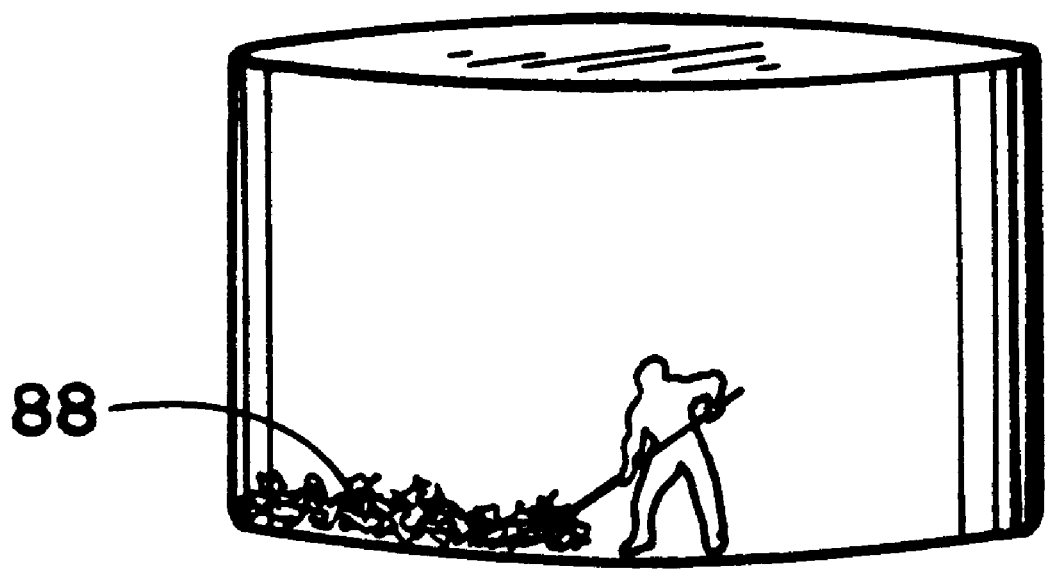
FIG. 12 is a schematic view of a tank with greatly reduced LEL levels where the worker using special recovery equipment can remove remaining deposits of sludge.

There are various options for handling the remaining solids 88 (FIG. 12) at this point. Lab results may help in deciding whether to:

a. Land Farm—these solids 88 may be hydro-blasted to a common manway or hatch door and removed.

b. Recycling—the solids 88 may be recycled to fuel blending, providing the material has a BTU value of 5,000 BTU/lb or greater. The introduction of coal fines has been successful in BTU enhancement or solidification for incinerator fuel. Solids 88 can be "squeegeed", shoveled and transported to hatch doors or manways for removal. Adding water to move the solids will decrease dryness and the BTU value. With recycling, 100% of the original "sludge oil" 40 is converted to three products: marketable crude oil, water and fuel. The procedure is now complete.

The following 2 examples are illustrative, and are not intended to limit the scope or range of this invention:

Example 1

A crude storage tank contained three feet of sludge oil. This sludge was a continuing problem for the operator. The oil from the tank was turned down by the buyer due to its poor quality. In addition sludge kept plugging the circulating suction pump. The sludge sample tested at 10% solids, 50% heavy asphaltines/paraffins, and 40% emulsified water.

The present invention was implemented. Due to the high volume of hydrocarbon in the sludge, the "oil-treat fluid" was used. The medium chosen for the treatment fluid was forty gravity oil, supplied by the operator. The oil was introduced into the tank at a temperature greater than 90 degrees F., with natural nutrients and circulated at this temperature for 1 day, using a hot oil truck to heat and circulate the system. Pumps were then shut off. The tank was insulated and heat-taped so temperatures would remain constant for existing, natural microbial cultures to grow. After seven days the sludge volume was 60% depleted. After fourteen days only a small amount of sediment remained. The crude oil was returned to the heater and then to an oil sales tank for selling purposes. The remaining solids were suctioned through the recycle pump and deposited into a holding vessel. The resulting solids volume was not large enough to warrant further treatment and was landfarmed.

Example 2

A tank contained over six feet of sludge oil and samples could only be taken from the top two inches of the sludge. A thirty-six inch pipe wrench was lowered into the tank on a rope, and could not penetrate any deeper than the oil sampler device. A treatability study was done on the samples with bacteria and bacteria enhancers recommended and supplied by a supplier of same. The tests showed that select strains of bacteria could reduce the pour point and viscosity and increase API gravity. The tests further demonstrated that as the solvent content increased and sludge volume decreased. The optimum treating combination was selected, lab work and a turn-key price were given to the customer.

The tank was circulated with the equivalent of five feet of an aqua-treat fluid, organic cleaning compounds, and material for stimulating bacteria cultures. The aqua-treat fluid temperature was raised, by circulation through a heater truck, to an optimum temperature where the bacteria would colonize downward from the aqua-treat into the sludge. The aqua-treat fluid temperature was maintained by continual circulation of it through the heater truck. After twenty-one days the sludge volume was less than one foot, and the layer on top of the aqua-treat fluid had three feet of pumpable hydrocarbons. One foot of thirty-seven gravity crude was introduced with bacterial nutrients. Since time was not an immediate consideration for the operator, the tank was allowed to stand dormant for another twenty days. After forty-one days of treatment the sludge was reduced to hydrocarbon free solids. The top oil had an increase in specific gravity from 31.1 to 33.6 API and a 10% (ten percent) increase in solvent composition with a pour point reduction of twelve degrees from 115 deg. F. to 103 deg. F.

A recycle pump transferred the resulting fluids to a three phase separator to divert the fluids to separate storage tanks and settle the solids. The water was hauled to a deep saltwater disposal well facility. The oil was sold as marketable crude. The solids were reduced from the sludge volume by 90% and land farmed.

The process was successful in treating the sludge. Bacteria changed the chemical and physical properties of the sludge oil. Thinning and dilution agents resulted from solvents produced through their metabolic process. Bacteria breaks down long chain oil molecules into the short chain solvents. The resulting oil recovered from sludge has a higher gravity and a higher percentage of hydrocarbon recovery from the sludge or "tank bottoms" 40. No harmful chemicals were used in any part of this process.

Since the inception of the above identified invention, applicant has discovered various improvements to the system and process as described below.

Figure 4:
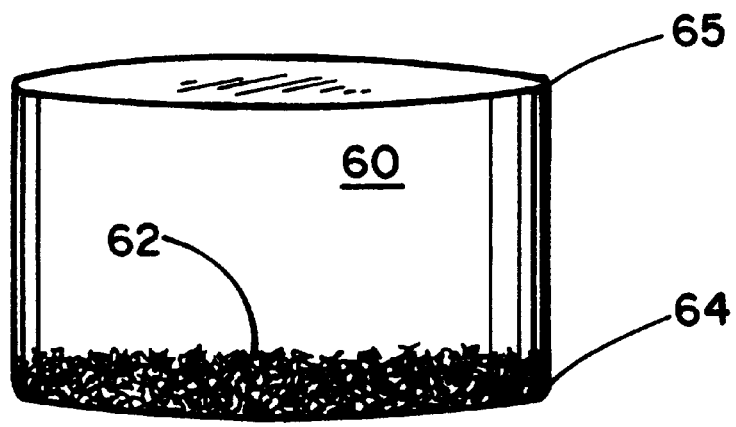
FIG. 4 is a schematic view of a crude oil tank pumped to the lowest level with sludge at the bottom.
Figure 14:
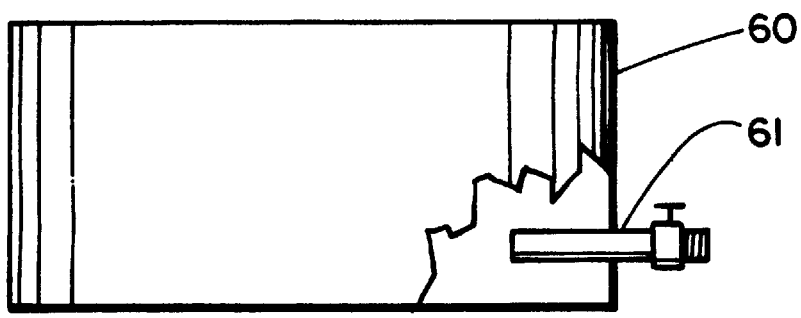
FIG. 14 is a schematic view of a tank having an existing opening.

Referring to FIG. 4 a tank 60 having sludge 62. on the bottom 64 will first have all of the existing fluids removed from the tank 60. Theses fluids are typically removed by pumping the fluids through an existing opening 61 (FIG. 14 and 16) or by accessing the tank 60 over the top 65 (FIG. 15) of the tank 60 or through a hot tap.

Figure 5:
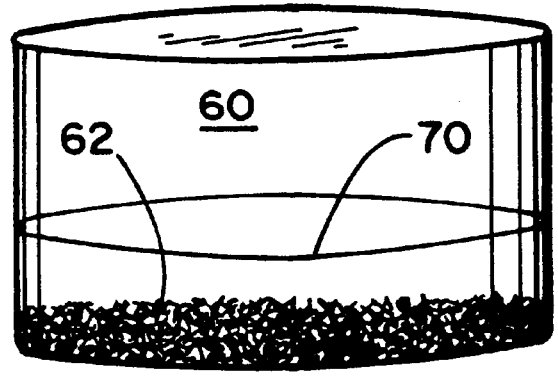
FIG. 5 is a schematic view of the crude oil tank shown in FIG. 4 with treatment fluid added to the tank.

Referring to FIG. 5 a volume of treatment fluid 70 e.g. cutter stock is added to the tank 60. Normally if the sludge 62 is primarily a waterbased sludge then the treatment fluid 70 should be waterbased. If the sludge 62 is primarily oil based (as opposed to waterbased) normally a hydrocarbon based treatment fluid 70 should be used. The crude oil contained in the tank 60 may in certain situations have a high enough specific gravity to be used as a treatment fluid 70 in which case an operator leaves the preexisting crude oil in the tank 60 to be used as the treatment fluid 70. Some examples of commonly used treatment fluid 70 are water, brine, number two diesel fuel, VGO (Virgin Gas Oil) and crude oil. An oil based treatment fluid 70 should have shorter hydrocarbon chains than hydrocarbon chains in the sludge 62. The shorter hydrocarbon chains will cut or fluidize the longer chains. This enables solids to settle out of the sludge 62, promotes hydrocarbon separation, and decreases the viscosity of the hydrocarbons.

Figure 6:
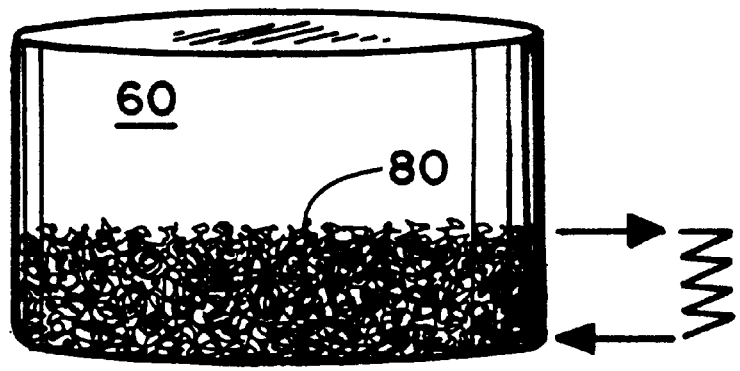
FIG. 6 is a schematic view of the tank with sludge and a combination of treatment fluid, chemicals, biosurfactants, microorganisms, etc. heated and vigorously circulated.

Referring to FIG. 6 the next step is to add thermal and mechanical energy to the contents 80 (contents 80 includes sludge 62 mixed with treatment fluid 70) in the tank 60. This is typically done by heating and circulating the contents 80. During this step the lab work may suggest to the operator to add chemicals, biosurfactants, microbes, enzymes or a combination thereof as previously described. Mild agitation may be added to the tank 60 by the existing tank mixer 14 (FIG. 1) to swirl the contents 80. However applicant has discovered it is desirable to add vigorous mixing/agitation to the contents 80 through a process referred to as HYDROCARBON SHEARING. The sludge 62 in the tank 60 normally comprises crude oil, dirt, water and rust which builds upon itself and clings together. Vigorous mechanical energy or agitation can be used to force apart this mixture. One of the major advantages of this invention is that the entire separation process takes place in the tank 60 itself as opposed to prior systems where the contents are removed from the tank 60 and treated outside the tank 60.

Figure 13:
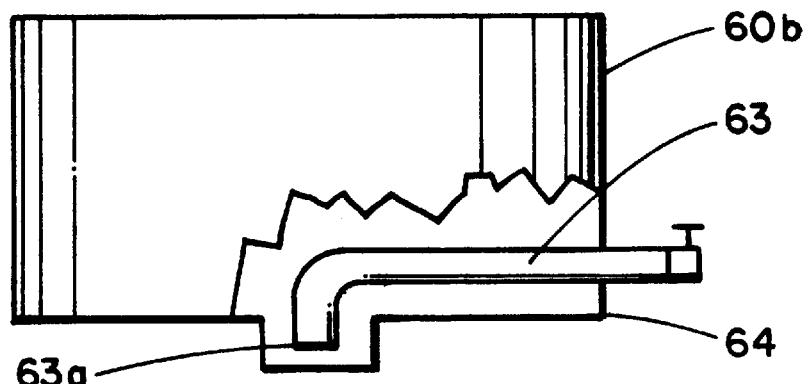
FIG. 13 is a schematic view of a tank with a sump line.

In order to carry out the vigorous mechanical energy process of the present invention the operator must have access to the tank 60 in some manner. Most tanks 60 having existing nozzles 61 (FIG. 14 and 16) (normally between one and four openings), and a sump drain or water draw off line (FIG. 13). The sump drain line 63 (FIG. 13) (A sump drain line 63 is a line which terminates in a sump 63a below the bottom level 64 of the tank 60b), is used as a suction or feed line to the circulation pumps for adding thermal and/or mechanical energy to tank contents 80.

If there are not enough existing openings 61 to the tank 60 an operator can create additional openings 61 to the tank 60 by a hot tap. An operator normally adds between one and eight openings 61 to the tank 60 depending on the nature of the sludge to be treated and the size of the tank. However, more openings 61 aid in the agitation of the sludge 62 and contents 80. Therefor in certain situations where there are four existing openings to the tank 60, the operator may hot tap, for example, four additional openings to the tank 60.

Figure 18:
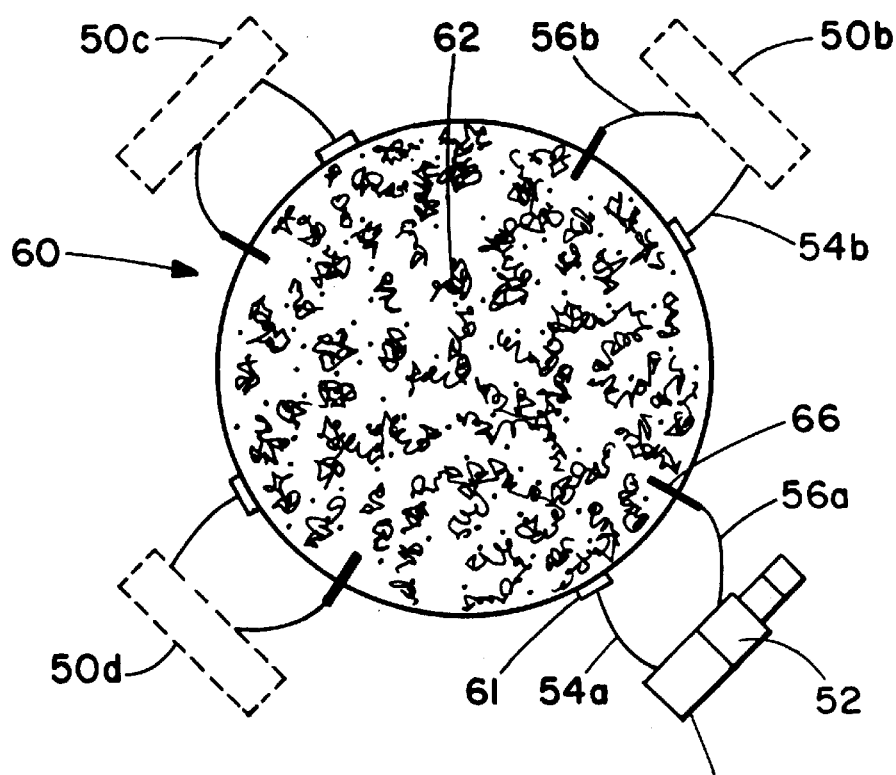
FIG. 18 is a top view of a tank with four trucks having lines connected to existing openings to the tank and four lances which have been introduced into the tank through hot tapped openings.

The operator then adds a device to vigorously agitate the contents. For example, one may access the tank 60 by introducing lances 66 (FIG. 7, 16 and 18) through the openings 61. A stuffing box 67 and valve 68 are part of the connection between the tank 60 and the lances 66. The connection enables the operator to move the lances 66 in and out, at various angles between the tank sidewall 69 and the lance 66 to enhance the ability to agitate the contents 80.

Figure 7:
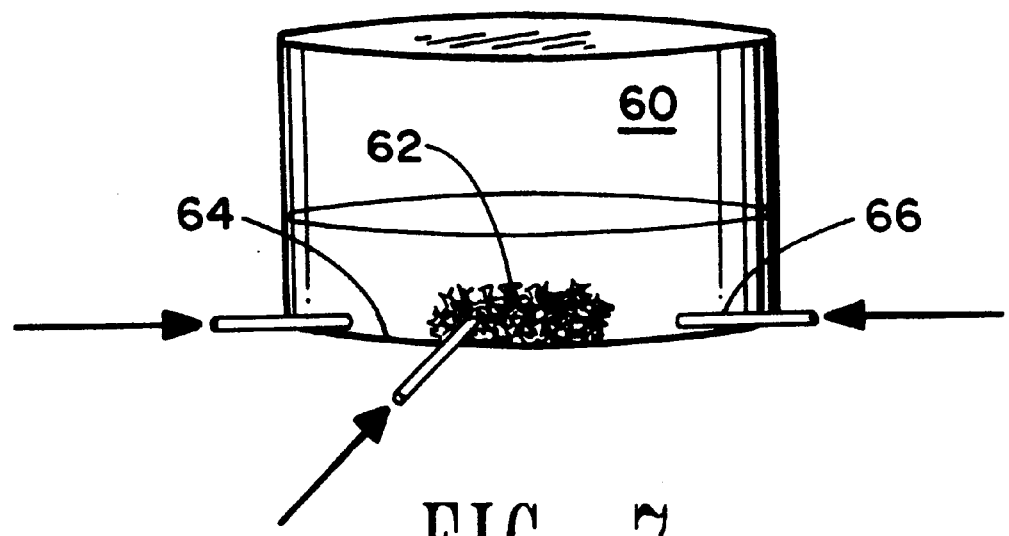
FIG. 7 is a view similar to FIG. 6 where the contents are vigorously circulated by directing fluid under pressure through lances toward the sludge at the bottom of the tank.
Figure 8:
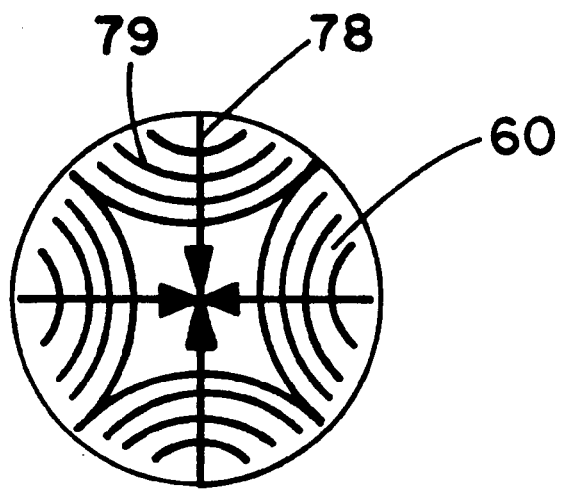
FIG. 8 is a top schematic view of the invention which is similar to FIG. 7.

Normally the truck 50 will pump a portion of the contents through line 54 to the truck 50. The truck 50 then heats the treatment fluid and pumps it back to the tank by a return line The contents 80 may be filtered by any common, known means before reintroduction into the tank 60. The lances 66 direct the treatment fluid 80 back into the tank 60 at pressures up to and exceeding 2,000 psi although the pressures are generally in the range of 500–1500 PSI and a pressure of 1800 PSI is presently preferred. As best shown in FIG. 7, it may be desirable to direct the lances 66 toward or along the bottom level 64 of the tank 60 to break up and expose the sludge 62 compacted on the bottom 64 of the tank 60. The pumps 52 to be used in the system should be capable of pumping in the range of one to twenty barrels per minute and at pressures in the range of 500 to 3,000 psi. FIG. 8 show the lines of force 78 created by four lances 66 and waves 79 created by the force within the tank 60. To heat the treatment fluid 70 or contents 80 the truck 50 may have heating coils (not shown) with thermal energy supplied by a propane burner. Other types of heaters could also be used, such as for example a steam heat exchanger. Some tanks have existing heating devices which could be placed in service to heat the tank contents.

Referring to FIG. 17, a hose 66a may be added on to the end 66b of each lance 66. The hose 66a may be about 2½ feet in length although the length can vary according to the size of the tank 60. The hose 66a further aids in the effort to mix/agitate the contents 80 including the sludge 62 in the tank 60 due to a "whipping" action created by forcing the treatment fluid 70 or contents 80 under pressure through the hose 66a and the forces of the swirling contents 80 impinging on the outside of the hose 66a. A nozzle 66c such as an inductor nozzle (FIG. 17A) may be added to the end of each hose 66a to further aid in increasing the pressure at which the fluid is sprayed or reintroduced to the tank 60.

Figure 19:
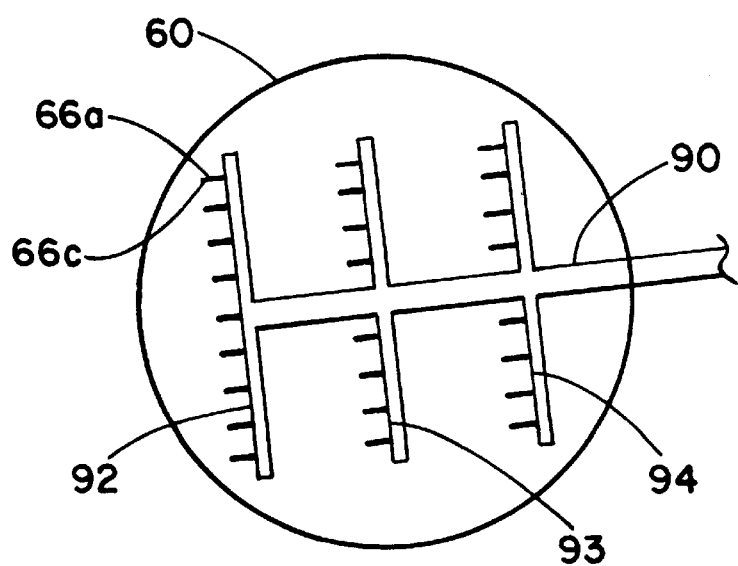
FIG. 19 is a top view of another embodiment of the invention.

In another arrangement shown in FIG. 19 for adding thermal and mechanical energy to the tank 60, a single access or opening 61 may be used to introduce the heated treatment fluid 70 under pressure to the tank 60 through a main pipe 90 located proximate the bottom 64 of the tank 60. A series of branch pipes 92, 93, 94 extending across the tank 60 are connected to the main pipe 90. Each branch pipe 92, 93, 94 has a series of nozzles 66c and/or "whip" hoses 66a attached to the main pipe 90 (e.g. one hose nozzle 66c every one foot along the length of a branch pipe 92, 93, 94). The hose 66a and nozzle 66c will preferably extend downward in the tank 60 to direct the pressurized fluid 70 toward the sludge on the bottom of the tank 60 to agitate same.

Figure 9:
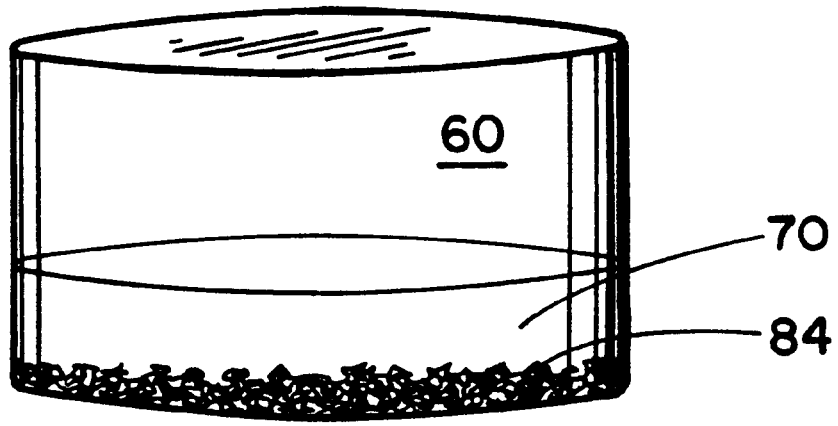
FIG. 9 is a schematic view of the tank after labwork has indicted the heating and circulating should stop.

Referring to FIG. 9, after a certain interval of supplying thermal and mechanical energy, such as for example four hours, the pumps 52 can be shut down to allow a sample to be taken from the tank 60 after the contents settle. Samples may be taken at all levels (e.g. top, middle and bottom) of tank 60 with common sampling equipment (not shown) like the eighteen inch W.L. Walker Model A-70002. Additional lab work can be preformed on the sample in order to determine the amount of progress which has been made. The next step or action to be taken by the operator will be dictated in part by the results of the sample i.e. material separation. If the progress is slow an experienced operator will consider available options such as treating for additional time, changing the cutter stock, adding microbes, surfactants, etc. The operator hopes the sample will catch only grit, sand and rust at the bottom of the tank which indicates the process has broken down the sludge and separated the hydrocarbons. Hydrocarbons can be removed and recovered as previously described. Solids 84 will settle at the bottom of the tank 60.

Figure 10:
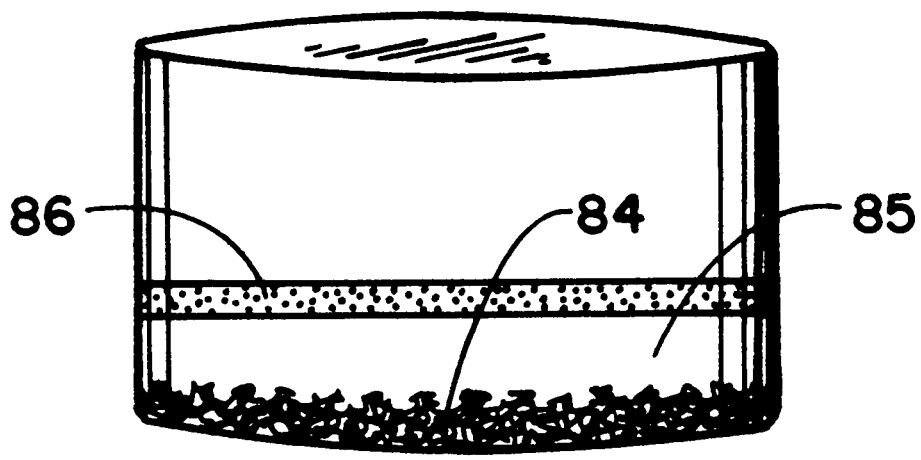
FIG. 10 is a view of the tank similar to FIG. 9 after high temperature water has been injected to further separate recoverable hydrocarbons from the residual solids.
Figure 11:
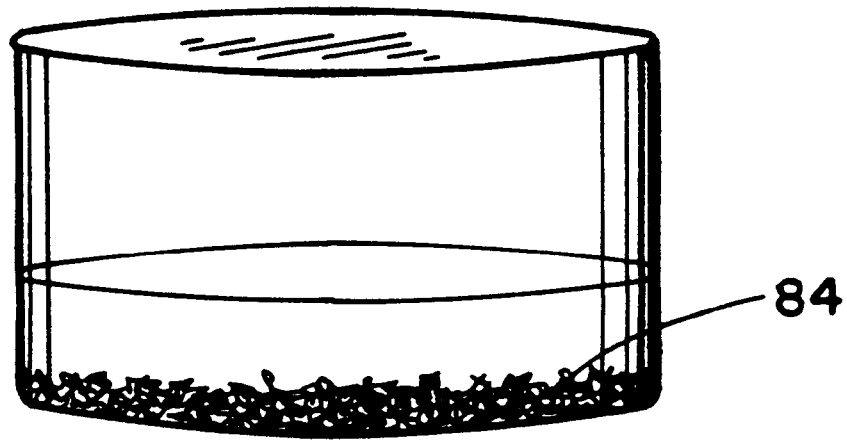
FIG. 11 is a view of the tank after the volume of hydrocarbons a are skimmed from the water.

Referring to FIG. 10 and 11 after the sludge treatment process is completed the lances 66 may be removed from the tank 60. Next a volume of seperating or displacement fluid 85 having a greater specific gravity than the hydrocarbons such as high temperature water or brine as described above should be added to the tank 60 to separate the hydrocarbons from the bottoms and to separate the hydrocarbons into a layer or volume 86 for removal and recovery of these hydrocarbons. The hydrocarbons and the separating fluid 85are removed from the tank 60. The operator then uses techniques commonly known in the industry (FIG. 12) for removing the contents 88 remaining at the bottom of the tank 60. Such techniques include steam lancing, air moving, shoveling, etc.

In conclusion, therefore, it is seen that the present invention and the embodiments disclosed herein are well adapted to carry out the objectives and obtain the ends set forth. Certain changes can be made in the subject matter without departing from the spirit and the scope of this invention. It is realized that changes are possible within the scope of this invention and it is further intended that each element or step recited is to be understood as referring to all equivalent elements or steps. The description is intended to cover the invention as broadly as legally possible in whatever form it may be utilized.

What is claimed is:

1. A method for using a biological system to recover a hydrocarbon volume and minimize wastes from a sludge oil in an oil storage tank, which includes the steps of:

sampling the sludge oil in the storage tank to determine a biological system for treating and recovering the hydrocarbon volume;

introducing a treatment solution comprising a volume of water, nitrogen, phosphorus, and microorganisms into the storage tank to break down the sludge oil into, in part, the hydrocarbon volume;

heating the treatment solution;

vigorously mixing and agitating the contents of the storage tank including the sludge;

breaking down the sludge with the microorganisms for separation of the hydrocarbon volume; and removing the hydrocarbon volume from the storage tank as a useable and processable hydrocarbon fluid.

2. The method according to claim 1 wherein said step of introducing the treatment solution further includes the step of introducing the treatment solution into the storage tank in a range of one to five parts treatment solution to one part sludge oil.

3. The method according to claim 1 wherein said step of introducing the treatment solution into the storage tank further includes the step of introducing the treatment solution comprising at least twenty parts nitorgen to one million parts treatment solution, at least five parts phosphorus to one million parts treatment solution, and a pH level of seven.

4. The method according to claim 1 further including the step of adding a BTU enhancing agent to a bottoms volume remaining in the storage tank after the hydrocarbon volume has been removed.

5. The method according to claim 1 further including the step of introducing additional microorganisms into the substantially hydrocarbon free sludge oil bottoms for continued decomposition.

* * * * *